Oct. 24, 1939.                F. MALINA                 2,177,574
                               PISTON
                       Filed Feb. 25, 1938            2 Sheets-Sheet 1

Inventor

Frank Malina

By

Attorney

Oct. 24, 1939.  F. MALINA  2,177,574
PISTON
Filed Feb. 25, 1938  2 Sheets-Sheet 2
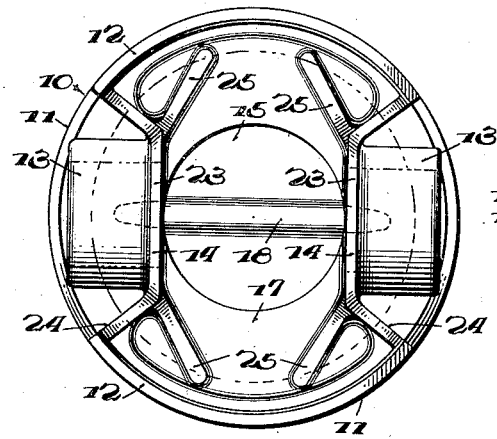
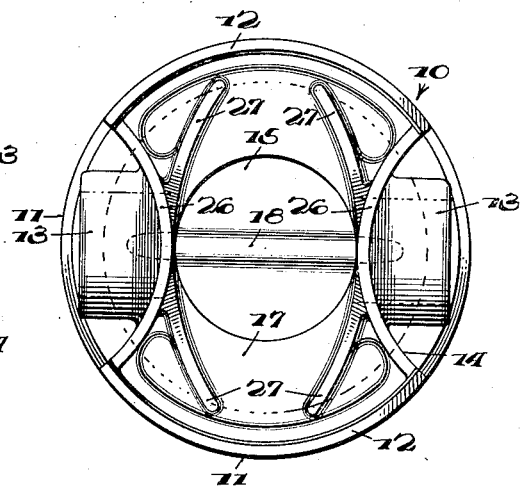
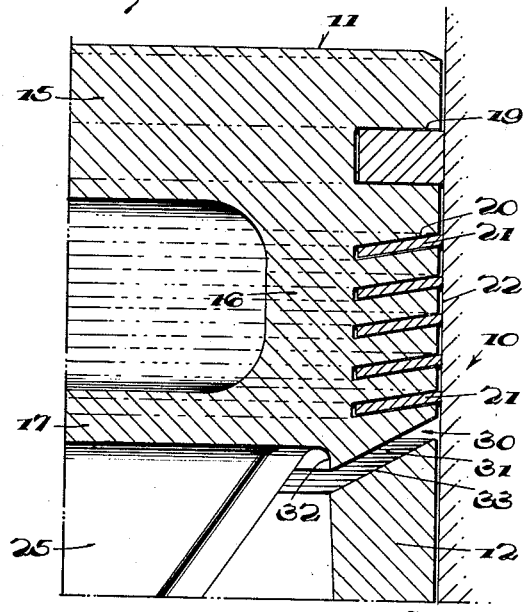
Inventor
Frank Malina
By
Attorney Patented Oct. 24, 1939

2,177,574

UNITED STATES PATENT OFFICE 2,177,574

PISTON

Frank Malina, Omaha, Nebr., assignor to Circle Motor Corporation

Application February 25, 1938, Serial No. 192,665

8 Claims. (Cl. 309—11)

The invention relates to pistons particularly adapted for internal combustion engines and especially to pistons formed of light weight metals or alloys.

One of the objects of the invention is to provide a piston of novel construction adapted to be cast of light metal alloy which will operate efficiently at varying temperatures in an engine cylinder.

Another object of the invention is to provide a piston of this character in which the heat will be distributed directly to the piston rings and cylinder wall and only indirectly to the wrist pin bosses and in which the wrist pin bosses will have uniform expansion and contraction and will always be maintained in alignment.

Another object of the invention is to provide a piston provided at the head with an interiorly arranged horizontal annular partition and having means for tying the wrist pin bosses to the partition thereby providing a structure of the requisite strength adapted to dissipate heat and capable of being cast by a readily removable single piece core and characterized by simplicity and sturdiness of construction and low cost of manufacture.

Another object of the invention resides in the provision of a piston having a laterally extending annular integral partition wall spaced from the top of the piston head and located substantially at the lower portion of the piston head and provided with a pair of oppositely disposed upwardly and outwardly bevelled arcuate margins cooperating with a pair of spaced similarly bevelled arcuate top faces of two oppositely disposed skirt portions to thereby provide an arcuate slot which functions to separate the piston skirts from the piston head and permit the passage of the lubricating oil and enable the same to reach the cylinder wall at points below the lowest oil ring on the upstroke of the piston. A construction of this character preferably includes the formation of a small arcuate rim-like wall disposed at the bottom face of the lateral partition wall and at its juncture with the lower end of the bevelled margin which prevents the oil from excessive splashing directly to the outer face of the cylinder wall.

Another feature of the invention resides in the provision of a piston provided with spaced wrist pin boss supporting walls having their upper ends formed integrally with the lateral annular partition wall and their side portions disposed in an oppositely outward direction diverging towards the outer ends of the wrist pin bosses to enable the piston to be provided with wider skirts.

Another object of the invention is to provide for each wrist pin boss a pair of reinforcing webs or flanges of substantially triangular shape disposed relatively angularly to one another and formed integrally with the lateral annular partition wall and the skirt connecting wall. These reinforcing webs or flanges not only reinforce the connection between the wrist pin bosses and the piston head but they also function as heat dissipators by transferring some of the heat in the piston head to the skirt connecting walls and they also tie the wrist pin bosses to the horizontal partition wall and control the wrist pin boss expansion maintain the wrist pin bosses in proper alignment at all times.

With these and other objects in view, the invention consists in the construction and novel combination and arrangement of parts hereinafter fully described, illustrated in the accompany drawings and pointed out in the claims hereto appended, it being understood that various changes in the form, proportion and details of construction, within the scope of the claims, may be resorted to without departing from the spirit or sacrificing any of the advantages of the invention.

In the drawings in which like charactes of reference designate corresponding parts:

Fig. 5 is a bottom view of the piston.

Fig. 6 is a similar view of a piston showing a modification of the skirt supporting walls and the reinforcing webs or flanges.

Fig. 7 is a plan view of one of the sealing rings.

Fig. 8 is an enlarged fragmentary cross section through the sealing ring retaining portion of the piston head showing a fragmentary portion of the cylinder wall and a pair of the sealing rings.

Figure 1:
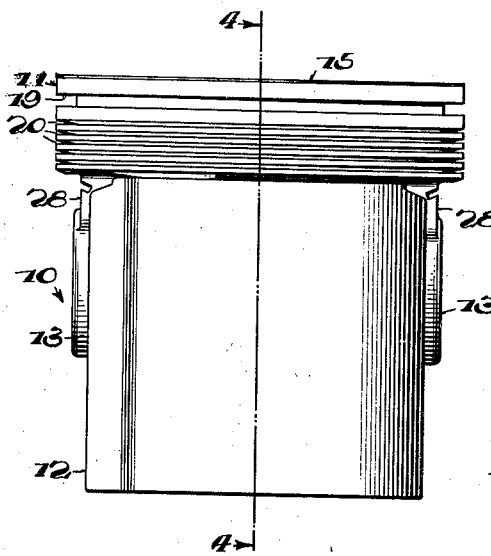
Figure 1 is a side elevation of a piston embodying the invention.

In the embodiment of the invention illustrated in Figs. 1 to 5, inclusive, the piston generally indicated by the numeral 10 comprises a head portion or piston head 11, a pair of oppositely disposed laterally and longitudinally elongated skirt portions 12, and two wrist pin bosses 13 formed integrally with two inwardly offset wrist pin boss supporting walls 14 formed integrally with the vertical side edges of the skirt portions 12.

The piston head 11 consists of a top wall 15, a vertical peripheral side wall 16 and a laterally extending annular partition wall 17. The vertical peripheral side wall 16 is formed integral with the top wall 15, and the lateral extending annular partition wall 17 is formed integral with the lower portion of the side wall 16. The top wall 15 is preferably reinforced at its inner or lower face with a transverse rib 18 disposed in substantial parallelism with the longitudinal axis of the wrist pin bosses 13, and preferably of approximately segmental form in longitudinal section, as clearly illustrated in Fig. 3 of the drawings. The reinforcing rib 18 is rounded transversely at its longitudinal edge and its side faces are preferably flat, as clearly shown in Fig. 4 of the drawings.

The piston head side wall 16 is provided with a sealing ring groove 19 adopted to receive any suitable type of compression or fire ring, such as a cast iron sealing or compression ring. Below the groove 19 the side wall 16 of the piston head is provided with a plurality of narrow closely spaced sealing ring receiving grooves 20, arranged at an inclination and extending upwardly and outwardly at an angle to the transverse axis of the piston, but the said grooves may be arranged either horizontally or at a downward and outward inclination, as shown, described and claimed in an application filed by me on the 25th day of February, 1938, Serial No. 192,664.

Figure 3:
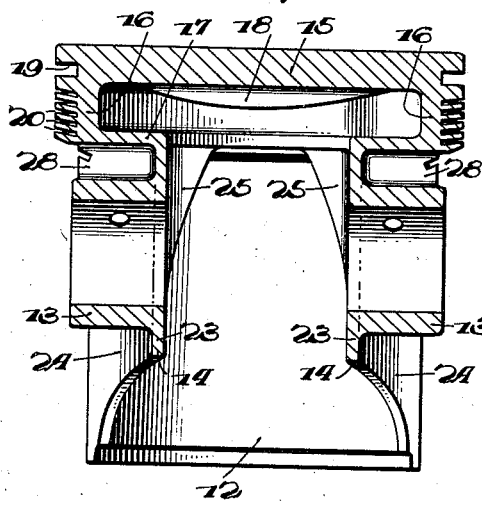
Fig. 3 is a vertical sectional view taken on the line 3—3 of Fig. 2.
Figure 4:
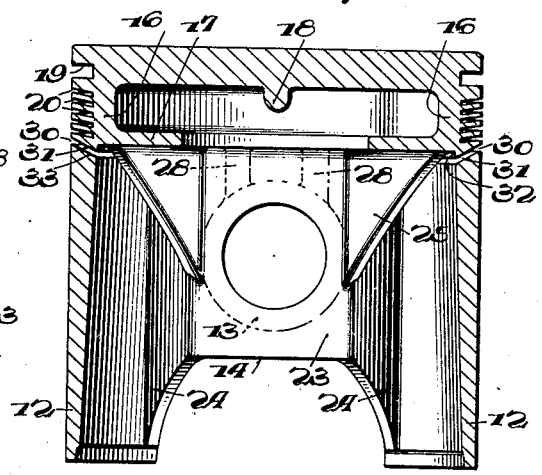
Fig. 4 is a similar view taken on the line 4—4 of Fig. 1.
Figure 4:

Each of the narrow grooves 20 is adapted to receive a thin resilient sealing ring 21 constructed of thin ribbon-like resilient metal bent edgewise in circular form and dished when the grooves are inclined, as shown in Figs. 3 and 4, and flat when the grooves are arranged horizontally, as fully explained in the aforesaid application, and as the construction and arrangement of the grooves 20 and sealing rings 21 are claimed in the aforesaid application, no claim is made to such subject matter in the present application.

As explained in the aforesaid application, each of the sealing rings 21 snugly fits in its associated groove which has imperforate walls, and which are adapted on the upward stroke of the piston to carry sufficient lubricating oil to lubricate the cylinder wall 22.

The wrist pin bosses 13 are formed integral with the intermediate portions 23 of the boss supporting walls 14, and the said intermediate portions 23 of the walls 14, as illustrated in Figs. 2, 3, 4 and 5 of the drawings are formed at their upper end portions integral with the lower face of the transverse annular partition wall 17. The side portions 24 of the boss supporting walls 14 are disposed at an angle to the intermediate portion 23, and diverge outwardly to provide pockets or recesses exteriorly of the interior of the piston for the wrist pin bosses which are located within the exterior pockets or recesses provided by the walls 14, and also within the circumferential limits or circle defined by the piston head so that there will be no liability of the bosses accidentally contracting with the cylinder walls. The particular construction of the walls 14 not only provide ample clearance for the bosses 13, but they also enable the piston to be provided with wider skirt portions 12, and facilitate circumferential expansion of the skirt portions 12 which are formed integral with the outer diverging side portions 24. The walls 14 having the intermediate portions 23 and the side portions 24 serve to support the skirt portions 12 as well as the wrist pin bosses 13, and in order to control the expansion and contraction of the wrist pin bosses and maintain the same at all times in alignment, the wrist pin bosses and the intermediate portions 23 of the walls 14 are tied to the horizontal partition wall 17 by reinforcing webs or flanges 25 of substantially triangular shape disposed in pairs at the upper portions of the walls 14 and arranged at an angle to each other, and to the intermediate and side portions of the walls 14 and also to the longitudinal axis of the wrist pin bosses and diverging inwardly. The reinforcing webs or members 25 are formed integral with the lower face of the horizontal annular partition wall 17, and with the intermediate and side portions of the walls 14 at the corners formed by said side and intermediate portions of said walls 14, and they reinforce the wall connection between the wrist pin bosses 13 and the piston head 11, and at the same time, function as heat dissipating walls by transferring some of the heat from the piston head to the skirt connecting the boss supporting walls 14. The horizontal wall partition 17 and the triangular webs or members 25 avoid any direct connection of the boss supporting walls with the top wall of the piston head, and the horizontal partition wall forms an air chamber between the top wall of the piston head and the wrist pin bosses so that the intense heat of the piston head is conveyed away by the piston rings and the cylinder walls, and the remaining portion of said heat is dissipated by the triangular webs or members 25. By the aforesaid construction and arrangement the piston bosses are relieved of the intense heat to which the piston head is subjected, and expansion and contraction of the wrist pin bosses is reduced to a minimum, and at the same time the wrist pin bosses are maintained in alignment at all times, and lateral binding of the wrist pin bosses on the wrist pins is prevented.

Instead of employing the angular arrangement of the boss supporting walls 14 and the reinforcing and expansion controlling webs or members 25, the skirt connecting walls 26 may be curved and the reinforcing and boss expansion controlling webs or members 27 may be curved, as illustrated in Fig. 6 of the accompanying drawings. The skirt connecting and boss supporting walls present outer concave faces and inner convex faces while the webs or members 25 diverge from each other and from the side portions of the walls 26 and also from each other. The curved skirt connecting and boss supporting walls 26 and the reinforcing and boss expansion controlling webs or members 27, function substantially the same as the walls 14 and the webs or members 25 heretofore described.

Figure 2:
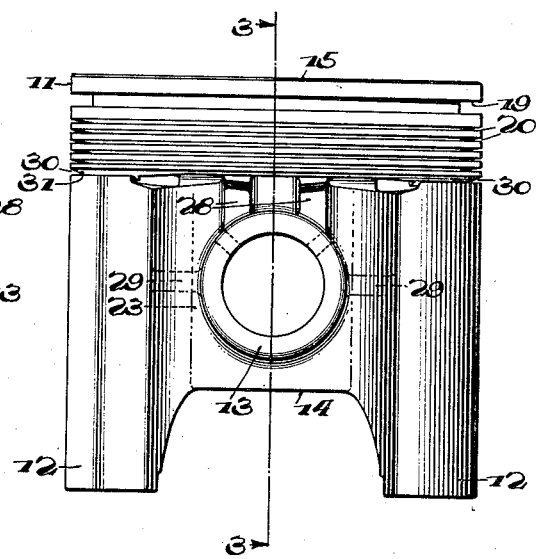
Fig. 2 is a side elevation of the piston viewed at right angles to Fig. 1.

The wrist pin bosses are preferably reinforced by fillet plates 28 arranged in pairs, as clearly illustrated in Fig. 2 of the drawings, and in pistons of the heavy duty type additional reinforcements of the bosses may be provided by horizontal fillets 29, but the latter may, of course, be omitted when not required. The piston skirts progressively taper in thickness downwardly from their upper edges to their lower edges, and the supporting walls which connect the piston skirts are preferably tapered at their lower portions below the wrist pin bosses.

The lower portion of the piston head 11 at substantially the periphery or marginal side of the horizontal annular partition wall 17 is cut at 30 at a sharp angle to separate the upper edge of the skirt portion 12 from the piston head 11, to provide an upwardly and outwardly inclined slot or channel 31 extending arcuately of the piston from one side edge of the skirt portions to the other side edge thereof, and also between the upper ends of the side portions of the walls 14 and the annular horizontal partition wall 17. The channels prevent direct transfer of heat from the piston head to the skirts of the piston, and also provide passages to permit the lubricating oil to pass from the interior of the piston to the cylinder wall below the lowermost ring during the upward stroke of the piston.

The piston head is provided at the slot or channel 31 with a depending rim-like arcuate wall 32 consisting of a flange projecting from the lower face of the horizontal partition wall 17 at the lower end of the piston head, to prevent oil from excessive splashing directly through the slot or channel 31 on to the outer piston wall. The piston skirts and the upper edges of the side portions of the boss supporting walls 14 are bevelled or inclined at 33 at the ends of the slot or channel 31. The bevelling of the piston skirts and the upper ends of the side portions of the wrist pin boss supporting walls, form tapered portions at the top of the piston skirts.

The surface of the piston skirts, the boss supporting walls and the reinforcing and expansion controlling webs or flanges, are vertical or in parallelism with the longitudinal axis of the piston, so that the piston structure from the horizontal annular partition to the lower end of the piston may be cast with a single piece core, and the core may be pulled without collapsing or previous removal of any portion thereof, thereby materially reducing the cost of manufacture of the piston. The interior of the piston above the horizontal annular partition wall may be formed by a sand core, and the opening in the annular horizontal partition wall may if desired, be plugged to form a dead air chamber or it may be left open, if desired.

What is claimed is:

1. A piston including a piston head comprising a top wall, a depending peripheral wall and an annular partition wall extending inwardly from the peripheral wall and spaced from the top wall, supporting walls depending from the piston head and having outwardly diverging side portions forming exterior pockets, aligned wrist pin bosses located wholly withiln said pockets entirely exteriorly of the piston and formed integral with said supporting walls, circumferentially spaced piston skirts having their side edges integraly connected to the outer side edges of the diverging side portions of said supporting walls, and reinforcing and temperature controlling members formed integral with the wrist pin bosses and the annular partition wall and tying the said parts together and maintaining the wrist pin bosses in alignment at all times.

2. A piston including a piston head comprising a top wall, a depending peripheral wall and a transverse partition wall extending inwardly from the peripheral wall and spaced from the top wall, vertical supporting walls depending from the piston head and having exterior pockets, aligned wrist pin bosses arranged in said pockets wholly exteriorly of the piston and formed integral with said supporting walls, circumferentially spaced piston skirts having their side edges integrally connected to the side edges of said supporting walls, and pairs of vertical reinforcing and expansion controlling webs formed integral with the bosses, the vertical walls and the transverse partition wall and tying the said parts together and maintaining the bosses in alignment at all times.

3. A piston including a piston head comprising a top wall, a depending peripheral wall and a transverse partition wall extending inwardly from the peripheral wall and spaced from the top wall, vertical supporting walls depending from the piston head and having outwardly diverging side portions forming exterior pockets, aligned wrist pin bosses located in the pockets wholly exteriorly of the piston and formed integral with the supporting walls, circumferentially spaced piston skirts having their side edges integrally connected to the outer side edges of the diverging side portions of the supporting walls, and inwardly diverging vertical reinforcing and expansion controlling members formed integral with the vertical walls and the piston head and tying said parts together and maintaining the bosses in alignment at all times.

4. A piston including a piston head comprising a top wall, a depending peripheral wall and a transverse partition wall extending inwardly from the peripheral wall and spaced from the top wall, vertical supporting walls depending from the transverse partition wall and having exterior pockets, aligned wrist pin bosses arranged wholly within said pockets and formed integral with the supporting walls, circumferentially spaced piston skirts having their side edges integrally connected to the side edges of the supporting walls, and vertical reinforcing and expansion controlling members consisting of webs formed integral with the transverse partition wall and with the supporting walls and arranged at an angle to the side portions of the supporting walls and diverging from the same and from each other and maintaining the bosses in alignment at all times.

5. A piston including a piston head comprising a top wall, a depending peripheral wall and an annular transverse partition wall extending inwardly from the peripheral wall and spaced from the top wall, vertical supporting walls depending from the transverse partition wall and having outwardly diverging side portions forming exterior pockets, wrist pin bosses formed integral with the supporting walls and arranged wholly within said pockets and exteriorly of the piston, piston skirts connecting the supporting walls, and substantially triangular reinforcing and temperature controlling members formed integral with the annular partition wall and with the supporting walls and tying the said parts together and maintaining the bosses in alignment at all times.

6. A piston including a piston head comprising a top wall, a depending peripheral wall and an annular partition wall extending inwardly from the peripheral wall and spaced from the top wall, vertical supporting walls depending from the annular partition wall of the piston head and having outwardly diverging side portions forming exterior pockets, wrist pin bosses arranged in the pockets and disposed exteriorly of the piston, and piston skirts connecting the vertical supporting walls, said piston being provided with inclined slots spacing the piston skirts from the piston head and having enlarged terminal extensions spacing the side portions of the supporting walls from the piston head, said inclined slots being arranged to form rim like flanges depending from the piston head at the said slots and adapted to prevent excessive splashes of lubricant from splashing directly through the slots.

7. A piston including a piston head comprising a top wall, a depending peripheral wall and an annular partition wall extending inwardly from the peripheral wall and spaced from the top wall, vertical supporting walls depending from the annular partition wall of the piston head and having outwardly diverging side portions forming exterior pockets, wrist pin bosses arranged in the pockets and disposed exteriorly of the piston, piston skirts connecting the vertical supporting walls, said piston being provided with inclined slots spacing the piston skirts from the piston head and having enlarged terminal extensions spacing the side portions of the supporting walls from the piston head, said inclined slots being arranged to form rim like flanges depending from the piston head at the said slots and adapted to prevent excessive splashes of lubricant from splashing directly through the slots, and vertical reinforcing and expansion controlling webs formed integral with the annular partition wall and with the supporting walls and tying the said parts together and maintaining the wrist pin bosses in alignment at all times.

8. A piston including a piston head comprising a top wall, a depending peripheral wall and a transverse partition wall extending inwardly from the peripheral wall and spaced from the top wall, supporting walls depending from the piston head and having outwardly diverging side portions forming exterior pockets, aligned wrist pin bosses formed integral with said supporting walls and extending outwardly therefrom into the exterior pockets, circumferentially spaced piston skirts having their side edges integrally connected to the outer side edges of the diverging side portions of said supporting walls, and reinforcing and temperature controlling members forming integral with the wrist pin bosses and the transverse partition wall and tying said parts together and maintaining the wrist pin bosses in alignment at all times.

FRANK MALINA.

CERTIFICATE OF CORRECTION.

Patent No. 2,177,574.　　　　　　　　　　　　　　　　October 24, 1939.

FRANK MALINA.

It is hereby certified that error appears in the printed specification of the above numbered patent requiring correction as follows: Page 1, second column, line 14, before the word "maintain" insert and; page 2, first column, line 18, for "adopted" read adapted; page 3, first column, line 56, for "integraly" read integrally; page 4, second column, line 18, claim 8, for "forming" read formed; and that the said Letters Patent should be read with this correction therein that the same may conform to the record of the case in the Patent Office.

Signed and sealed this 21st day of November, A. D. 1939.

Henry Van Arsdale,
(Seal)　　　　　　　　　　　　　　　　Acting Commissioner of Patents.